United States Patent
Fuhrmann

[19]

[11] Patent Number: 6,051,799
[45] Date of Patent: Apr. 18, 2000

[54] APPARATUS HAVING AN IMPROVED PUSH-BUTTON CONSTRUCTION

[75] Inventor: Karl Fuhrmann, Vienna, Austria

[73] Assignee: U.S. Philips Corporation, New York, N.Y.

[21] Appl. No.: 09/264,071

[22] Filed: Mar. 8, 1999

[30] Foreign Application Priority Data

Mar. 27, 1998 [EP] European Pat. Off. ............. 98890081

[51] Int. Cl.⁷ ...................................................... H01H 3/20
[52] U.S. Cl. ........................................ 200/331; 200/332.2
[58] Field of Search .................................. 200/329, 331, 200/332, 332.2; 455/88, 90, 91–100, 550–575

[56] References Cited

U.S. PATENT DOCUMENTS 4,387,282  6/1983  Latasiewicz ............................ 200/340
5,627,727  5/1997  Aguilera et al. ........................ 361/686
5,925,860  7/1999  Lee ............................................ 200/18

*Primary Examiner*—Lincoln Donovan
*Assistant Examiner*—Nhung Nguyen
*Attorney, Agent, or Firm*—Leroy Eason

[57] ABSTRACT

Apparatus having a wall and a button arranged in an area of the wall, button actuating means, a switch which is remote from the button actuating means, switch actuating means, and transmission means arranged between the button actuating means and the switch actuating means. The button actuating means is formed by a bell-crank lever which is pivotable about a pivot which is displaced toward the switch in a direction parallel to the wall of the apparatus. The transmission means is formed by a transmission bar supported so as to be movable at least substantially in a direction parallel to the wall and which extends substantially in that direction.

6 Claims, 1 Drawing Sheet

APPARATUS HAVING AN IMPROVED PUSH-BUTTON CONSTRUCTION

BACKGROUND OF THE INVENTION

1. Field of the Invention

The invention relates to an apparatus having a wall and at least one actuating button arranged in an area of the wall, which button has a button head which is movable in an opening in the wall in a direction transverse thereto. Actuating means for the button head is included in the interior of the apparatus. A switch is disposed in the interior of the apparatus at a given distance from the button head in a direction parallel to the wall. Transmission means are arranged between the actuating means of the button head and the actuating means of the switch, and is actuated by the button actuating means upon actuation of the button, to thereby cause the actuating means of the switch to be actuated.

2. Description of the Related Art

Apparatus of the type defined in the opening paragraph, i.e. a video recorder, is commercially available from Mitsubishi under the type designation HS-751 V and is known therefrom. In the known apparatus the button is mounted in the area of a front wall of the housing of the apparatus and the button head is arranged in an opening in the front wall so as to be movable substantially transverse to the front wall. The button head is integrally connected to a lever provided as actuating means of the button and extending substantially parallel to the front wall and transverse to the upper wall and the bottom wall, the lever being pivotable about a pivot. The pivot is arranged out of line with respect to the button head in a direction towards the upper wall of the housing of the known apparatus. The switch is arranged in the interior of the apparatus at a given distance from the button head of the button in a given direction, namely a direction parallel to the front wall and perpendicular to the upper wall and the bottom wall, i.e. placed out of line with respect to the button head towards the bottom wall of the housing, a comparatively large distance of a few centimeters existing between the button head and the switch or the actuating means of the switch, viewed in the direction thereof. As a result of the fact that in the known apparatus the pivot of the actuating means of the button is disposed at the side which is remote from the switch in relation to the button head, i.e. near the upper wall of the housing, space is needed to accommodate the pivot between the button head and the upper wall of the housing, so that the button head cannot be arranged arbitrarily close to the upper wall of the housing. Moreover, as a result of the afore-described arrangement of the pivot for the actuating means of the button in the known apparatus, the button head performs a pivotal movement towards the upper wall of the housing upon actuation of the button head, which is experienced at least as uncommon or even as unpleasant by relatively many users.

SUMMARY OF THE INVENTION

It is an object of the invention to solve the aforementioned problems and to improve an apparatus of the type defined in the opening paragraph in a simple manner and without additional expense. According to the invention, in order to achieve this object the button actuating means are constituted by a bell-crank lever which is pivotable about a first pivot, the first pivot being displaced with respect head of the button head towards the switch, viewed in the direction parallel to the front wall, and the transmission means are formed by a transmission member which is movable at least substantially in the aforesaid direction and extends substantially in that direction.

In this way, it is achieved that in relation to the button head the pivot for the actuating means is situated closer to the switch than the button head, so that in relation to the button head no additional space is required to accommodate a pivot for the actuating means at the side remote from the switch. This has the advantage that the button head can be arranged arbitrarily close to a housing wall which adjoins the wall in which the button head is mounted and which extends transverse to this wall, which is found to be desirable and advantageous in comparatively many cases. Furthermore, by means of the measures in accordance with the invention it is achieved that upon actuation of the button head this button head performs an actuating movement which is not unexpected for a user but which is expected and customary. In this respect it is to be noted that in the case that the button to be actuated is arranged in the area of a front wall of an apparatus the measures in accordance with the invention result in an actuating movement of the button head of the button oriented towards the bottom wall which adjoins the front wall of the apparatus, which is regarded as customary and convenient by most users.

In an apparatus in accordance with the invention the transmission means can be formed by an actuating rod of suitable length provided as actuating means of the switch, but this requires a specially designed switch. Therefore, an embodiment wherein the transmission means is a bar which is movable relative to the actuating means of the switch has proved to be very advantageous. Such an embodiment appears to be of particularly simple construction and, in addition, such an embodiment also guarantees a high reliability.

Embodiments wherein the transmission bar is connected to a pivotable mounting bar are particularly advantageous because they guarantee a particularly reliable and good cooperation with the actuating means of a switch.

An embodiment wherein various elements of the apparatus are formed as an integral part can be manufactured at particularly low cost because it is tolerance independent. Moreover, such an embodiment has the advantage that it can be mounted in an apparatus in a very simple manner and without much expense.

An embodiment wherein the bell-crank lever and the transmission bar are pivotably connected by an integral hinge has proved to be particularly stable during testing.

The above-mentioned as well as further aspects of the invention will become apparent from the two embodiments described hereinafter by way of examples and will be elucidated with reference to these examples.

BRIEF DESCRIPTION OF THE DRAWINGS

The invention will now be described in more detail with reference to the drawings, which show two embodiments given by way of examples to which the invention is not limited. In the drawings.

DESCRIPTION OF THE PREFERRED EMBODIMENTS

Figure 1:
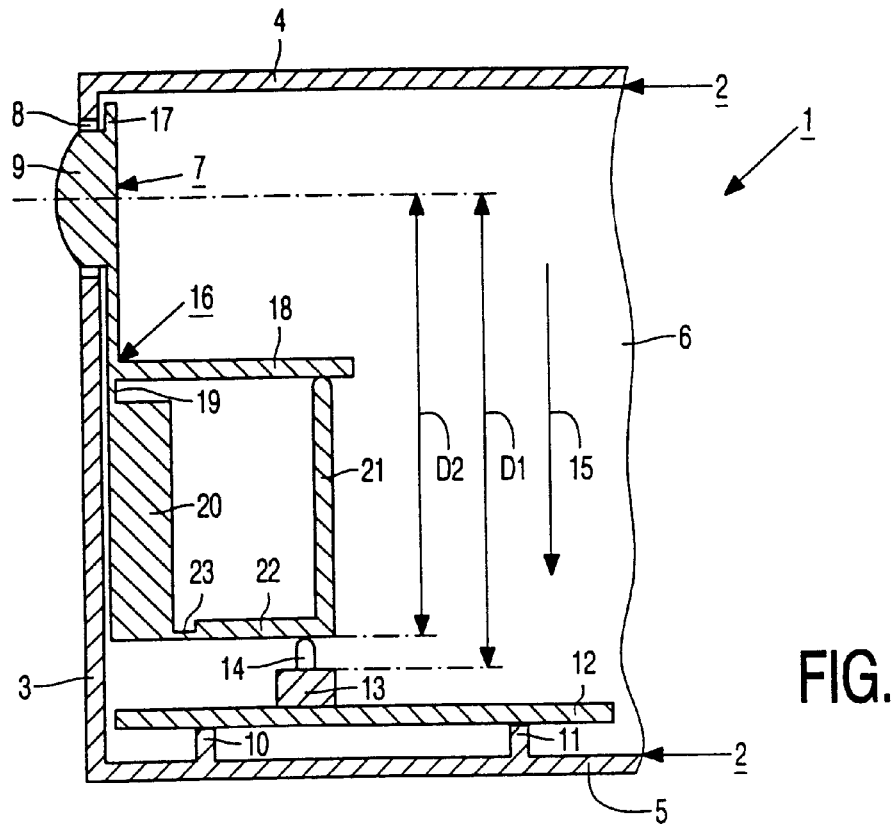
FIG. 1 shows a sectional view of a part of an apparatus in accordance with a first embodiment of the invention.

FIG. 1 shows diagrammatically an apparatus 1 in the form of a video recorder. The apparatus 1 has a housing 2, of which FIG. 1 shows a front wall 3 and parts of an upper wall 4, a bottom wall 5 and a side wall 6. The apparatus 1 has a plurality of actuating buttons in the area of the front wall 3. Of these buttons FIG. 1 shows only one button 7 for the sake of simplicity.

The button 7 comprises a button head 9 which is movable in an opening 8 in the front wall 3 transversely to the front wall 3. Actuating means connected to the button head 9 is in the interior of the apparatus, and is described in detail hereinafter.

Two mounting ribs 10 and 11 project from the bottom wall 5 and carry a printed circuit board 12, which is secured in the apparatus 1 in a manner not shown. In addition to other parts, not shown in FIG. 1, the printed circuit board 12 also carries a switch 13. The switch 13 has movable actuating means 14 formed by a switch rod, which in the present case is movable substantially perpendicularly to the bottom wall 5. The switch 13 is disposed inside the apparatus 1 at a given distance D1, indicated in FIG. 1, from the button head 9 of the button 7 in a direction parallel to the front wall 3 and indicated by an arrow 15 in FIG. 1.

In order to enable the switch 13 to be operated by means of the button 7 the apparatus 1 comprises transmission means arranged between the actuating means of the button 7 and the actuating means 14 of the switch 13. The transmission means can be actuated by the actuating means of the button 7 upon actuation of the button 7. When the transmission means are actuated they cause an actuation of the actuating means 14 of the switch 13. The transmission means are also described in detail hereinafter.

In the apparatus 1 the actuating means of the button 7 are advantageously formed by a bell-crank lever 16 which has a first lever arm 17 extending parallel to the front wall 3 and a second lever arm 18 extending transversely to the first lever arm 17. The bell-crank lever 16 is mounted on a support 20 so as to be pivotable about a first pivot 19, which support is secured in the apparatus I in the area of the front wall 3 in a manner not shown. In the present case, the first pivot 19 is formed by an integral hinge. Viewed in the direction 15 parallel to the front wall 3 the first pivot 19 is advantageously displaced with respect to the button head 9 of the button 7 towards the switch 13. This has the advantage that the button head 9 of the button 7 can be arranged almost arbitrarily close to the upper wall 4, as can be seen in FIG. 1.

In the apparatus 1 the transmission means are formed by a transmission member which is movable substantially in the direction 15 and which extends substantially in that direction, which transmission member is formed by a transmission bar 21 which is movable with respect to the actuating means 14 of the switch 13. The transmission bar 21 is integral with a mounting bar 22. The mounting bar 22 is supported so as to pivotable by means of a second pivot 23, namely also on the support 20, so that the support 20 forms a common support for the bell-crank lever 16 and for the transmission bar 21 together with the mounting bar 22. The mounting bar 22 cooperates with the actuating means 14 of the switch 13, which has proved to be advantageous for a reliable actuation of the actuating means 14. The second pivot 23 is also formed by an integral hinge. Viewed in the direction 15, the second pivot 23 and the end of the actuating means 14 of the switch 13 which cooperates with the mounting bar 22 have substantially the same distance D2 from the button head 9 of the button 7, which has proved to be very advantageous.

In the apparatus I the common support 20 and the two integral hinges, i.e. the first pivot 19 and the second pivot 23, and the bell-crank lever 16 together with the button head 9 and the transmission bar 21 together with the mounting bar 22 form an integral part, which has proved to be very advantageous for a simple manufacture and a simple mounting and for minimal tolerances.

Since the first pivot 19 has been displaced with respect to the button head 9 of the button 7 in a direction 15 towards the switch 13, the additional advantage is obtained that upon its actuation the button head 9 performs a small movement in a direction towards the bottom wall 5, which is regarded as logical and convenient by many users, as has appeared from tests.

Figure 2:
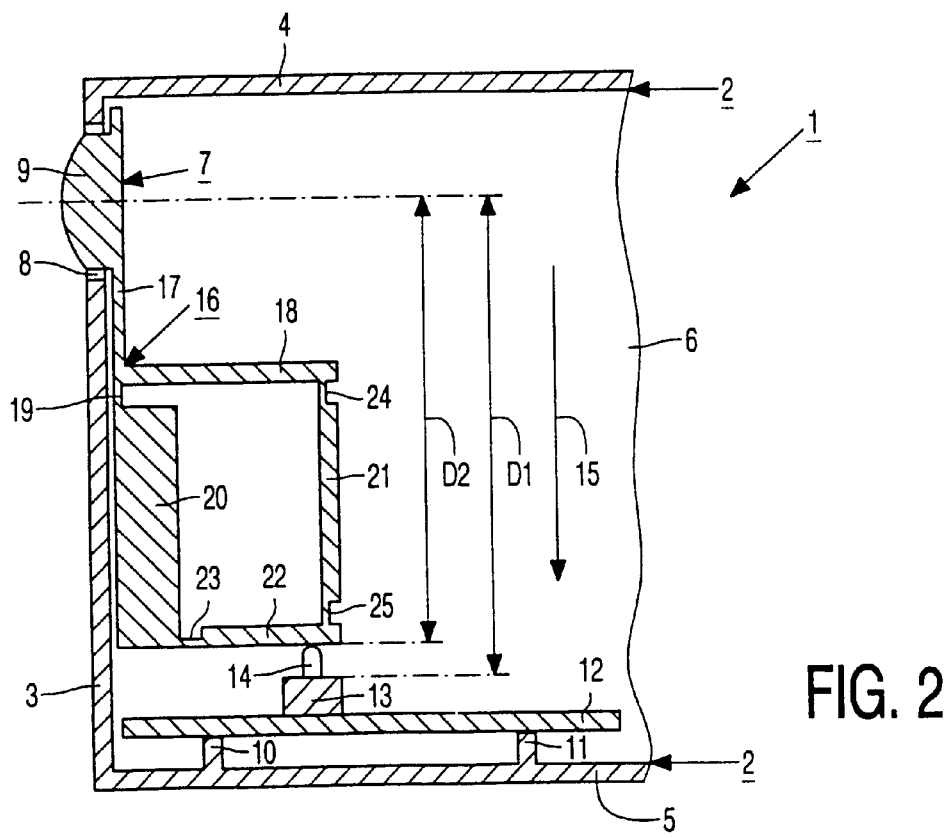
FIG. 2, in a view similar to in FIG. 1, shows an apparatus in accordance with a second embodiment of the invention.

In the apparatus 1 shown in FIG. 2 a construction similar to that of the apparatus 1 shown in FIG. 1 is used but two different features are to be noted.

In the apparatus 1 shown in FIG. 2 the bell-crank lever 16, i.e. the second lever arm 18 of the bell-crank lever 16, and the transmission bar 21 are pivotally connected to one another via a third integral hinge 24 and the transmission bar 21 and the mounting bar 22 via a fourth integral hinge 25 so as to form a single part. Such a construction has a particularly high stability and provides a particularly good guidance for the transmission bar 21.

The invention is not limited to the two apparatus is described hereinbefore, which are video recorders. The invention can also be used in other apparatuses, for example recording and/or reproducing apparatuses for audio signals but also in communication apparatuses, radio receivers and the like.

What is claimed is:

1. An apparatus comprising:

a wall and at least one actuating button arranged in an area of said wall, which button has a button head which is moveable in an opening in said wall in a direction transverse thereto;

a switch disposed in the interior of the apparatus at a given distance from said button head in a direction parallel to said wall;

switch actuating means in the interior of said apparatus and operatively coupled to said switch;

button actuating means in the interior of said apparatus and operatively coupled to said button head; and transmission means arranged between the button actuating means and the switch actuating means and which is actuated by the button actuating means upon operation of the actuating button, and when actuated causes actuation of the switch actuating means;

characterized in that:

(i) the button actuating means comprises a bell-crank bar which is pivotable about a first pivot (19) which is displaced with respect to the button head toward the switch in a direction parallel to said wall; and (ii) the transmission means is formed by a transmission member which is moveable in a direction substantially parallel to said wall and extends substantially in that direction.

2. An apparatus as claimed in claim 1, characterized in that the transmission member is formed by a transmission bar (21) which is supported in the apparatus so as to be movable with respect to the switch actuating means.

3. An apparatus as claimed in claim 2, characterized in that the transmission bar is connected to a mounting bar which is supported so as to pivotable by means of a second pivot (23) and which cooperates with the switch actuating means.

4. An apparatus as claimed in claim 3, characterized in that, viewed in a direction parallel to said wall, the second pivot (23) and that end of the switch actuating means which cooperates with said mounting bar have substantially the same distance (D2) from the button head.

5. An apparatus as claimed in claim 4, characterized in that both the bell-crank lever and the transmission bar are pivotally supported on a common support (20) via said mounting bar; the first pivot (19) and the second pivot (23) are each formed by an integral hinge; and the common support (20), the two integral hinges, the bell-crank lever, the transmission bar and the mounting bar form an integral part.

6. An apparatus as claimed in claim 5, characterized in that the bell-crank lever and the transmission bar are pivotally connected to one another via a third integral hinge (24), and the transmission bar and mounting bar are pivotally connected to one another via a fourth integral hinge (25).

* * * * *